June 26, 1962 — D. B. PALL — 3,040,894

FILTER

Filed July 12, 1960

INVENTOR.
DAVID B. PALL

BY Watson, Leavenworth & Kelton

ATTORNEYS

United States Patent Office 3,040,894
Patented June 26, 1962

3,040,894
FILTER
David B. Pall, Roslyn Heights, N.Y., assignor to Pall Corporation, Glen Cove, N.Y., a corporation of New York
Filed July 12, 1960, Ser. No. 42,396
10 Claims. (Cl. 210—90)

This invention relates to a filter assembly for use in removing suspended foreign matter from fluids, and particularly to a filter assembly for use in filtering hydraulic fluid in high pressure hydraulic fluid systems, which can be serviced without external leakage when cleaning is needed, and which can be reassembled without introduction of air into the system.

Many types of filters and filter assemblies are presently available for use in the filtering of fluids such as lubricating oil, hydraulic fluids and the like. These filters employ various types of filter elements and may be used to remove suspended particles having a size as little as 5 microns in largest dimension. These filters are very useful where the system employing a given fluid is sensitive to the presence of particles and a particle-free fluid must be maintained for efficient use and long life of the system.

One use for filters of the type with which this invention is concerned is in hydraulic systems for aircraft. Several filters of varying types are now employed in this capacity and all serve fairly well in removing the suspended particles for which the filter is designed. Two important disadvantages however, are characteristic of the presently available devices. In hydraulic systems, particularly, it is necessary that air be completely excluded therefrom if the system is to operate smoothly and reliably. During servicing of airplane hydraulic systems, it is therefore desirable to exclude entrance of air. It has been found, however, that when the filter elements of filters employed in these systems are removed for cleaning, which is usually done at every 50 to 400 hours of service, air is unavoidably introduced into the system. As an indication of the trouble caused by the introduction of air, it has been found that as much as 16 man hours of labor are required after servicing an airplane to remove the air from the hydraulic system. This is an indication of the need for a filter device from which the filter elements can be removed, cleaned and replaced without the introduction of air into the remainder of the hydraulic system.

Furthermore, these lines are not designed for ease of servicing when the filter element becomes clogged, as it inevitably does, and must be cleaned or replaced. It is virtually impossible to remove the element without some leakage, and it is also necessary in most cases to separately close off the line while the filter is disconnected.

Another disadvantage of many of the prior art devices is that they are not of the type which may be fabricated from a bar stock or forging, but must be made from castings. Because of the high pressure of the hydraulic systems employed in airplane control systems (3,000 p.s.i.), aluminum castings which are leakproof are impossible to obtain with any degree of consistency.

It is therefore an object of the present invention to provide a filter assembly which may be disassembled for cleaning and re-assembled without introducing air into the fluid system to which it is adapted, and without external leakage during this operation.

It is another object of this invention to provide a filter assembly of such design that it may be readily fabricated from a bar stock or forging.

In accordance with the present invention, the above-mentioned difficulties have been overcome by providing a filter assembly having a head containing an inlet and an outlet opening into the bottom thereof, a valve sleeve normally biased into a position to close off the inlet and outlet and arranged to form a closure therefor, and a filter bowl removably attached to the head over a long reach and containing a filter element arranged in operating alignment with the inlet and outlet, and also containing a lifting member adapted automatically to raise the valve sleeve to position to open the line while the bowl is attached to the head.

The valve sleeve has sealing surfaces arranged on both its inner and outer faces engaging corresponding surfaces on the head or parts associated therewith to provide a fluid-tight seal when the valve sleeve is in a closed position. The attachment of the head to the bowl is in a manner to prevent external leakage from the bowl during removal and reassembly and a leakproof seal may also be provided between the head and bowl to prevent leakage at high operating pressures. The bowl and head engage each other over a long reach such that during removal the bowl remains engaged to the head until the valve sleeve closes. Conversely, during assembly, the head is engaged to the bowl prior to opening of the valve sleeve. After the bowl has been removed, circulation of fluid through the filter assembly is stopped by the valve sleeve. This also halts circulation in the line. A bypass with, optionally, a relief valve, can be provided within the head for bypassing the filter at pressures exceeding a predetermined level.

On reassembly, the bowl is filled with fluid prior to attachment to the head. During attachment of the bowl, all entrapped air and excess fluid are forced out of the bowl before the bowl is sealed to the head and before the valve sleeve opens. In this manner, the filter element may be removed for cleaning, and because of the automatic shut-off feature, no air is introduced into the hydraulic system. As can be seen, the unit is practically foolproof in this respect, and no particular care is required on the part of the operator other than the necessity of filling the bowl with fluid prior to reassembly.

These and other advantages of the present invention will become evident in the discussion of the accompanying drawings in which.

Figure 1:
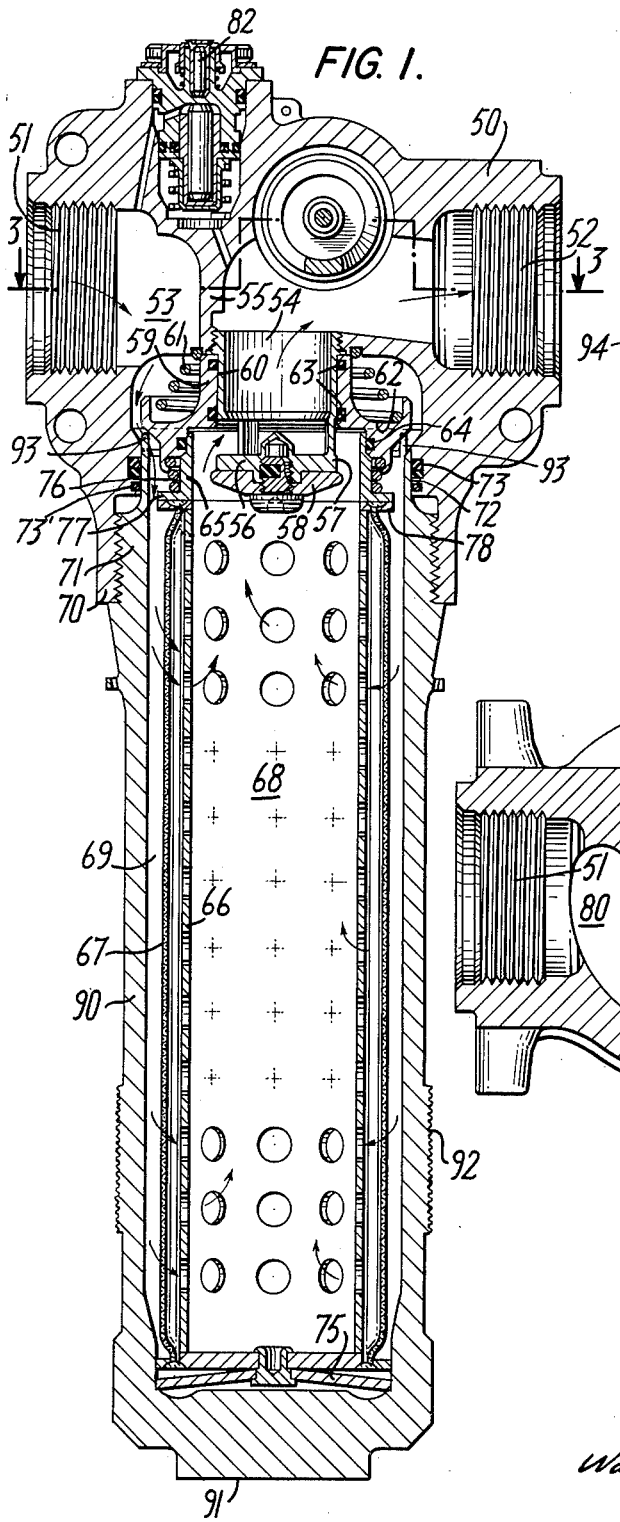
FIGURE 1 is an elevation in cross section of a filter assembly of this invention, having sealing elements arranged to ensure a leakproof seal during removal of the filter bowl from the head.
Figure 2:
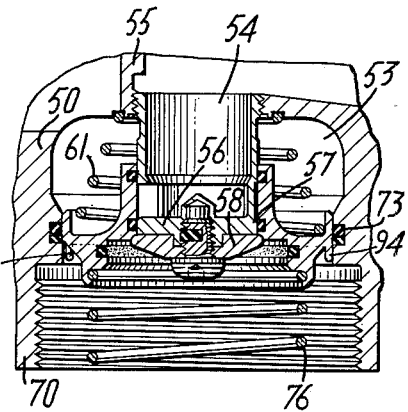
FIGURE 2 is a partial elevation in cross section of the head of another type of filter assembly having sealing elements arranged to prevent external leakage, short of a leakproof seal, during normal removal of the filter bowl from the head, and showing the position of the valve sleeve after the bowl has been removed.
Figure 3:
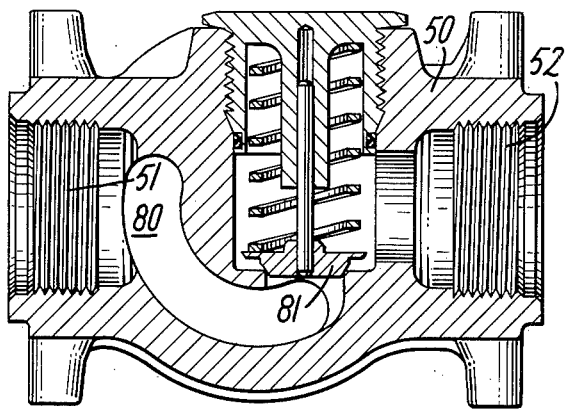
FIGURE 3 is a section taken along the line 3—3 of FIGURE 1, looking in the direction of the arrows.

FIGURES 1, 2 and 3 show embodiments of a filter assembly wherein the bowl remains attached to the head in a manner so as to prevent external leakage until the valve member has closed off the line. The filter assembly comprises a head 50 having an inlet channel 51 and an outlet channel 52, respectively, opening into an inlet chamber 53 and an outlet chamber 54 in the lower portion of the head. An intermediate cylindrical wall 55 within the head 50 separates the inlet channel 51 and the inlet chamber 53 from the outlet channel 52 and outlet chamber 54. Dependent from the lower portion of the cylindrical wall 55 and across the open end of chamber 54 is a valve seat 56 having side sealing surfaces 57. To this is fixed the diaphragm retainer bushing 58, which serves as a stop for the valve sleeve 59, which is slidably and sealingly mounted on the exterior surface of the upper portion 60 of the valve seat 56, which is threaded into the cylindrical wall 55. The valve sleeve is biased towards the bushing 58 by means of the spring 61, the lower end of which is fitted in the indentation 62 on the upper face of the valve sleeve. The upper end is lodged in a slot in the head. Two sealing elements 63, which can be of any desired configuration but in this case are in the form of inner O-rings made of Viton "A" (fluorocarbon rubber), provide a fluid-tight seal between the surface 57 and inner surface of the valve sleeve 59. When the valve sleeve is in position to engage the sealing surface 57, as shown in FIGURE 2, chamber 54 is closed off. Another sealing element 64 of the same type ensures a leakproof seal between the valve sleeve and the valve seat 65, which desirably is permanently attached to the upper end of the internal support core 66 for the filter element 67. While the valve sleeve is in the position shown in FIGURE 1, seal 64 prevents leakage into the central passage 68 enclosed by the filter element from the external passage 69 between the filter element and the bowl 90, bypassing the filter.

The head 50 has an internally threaded lower portion 70 which forms an outer cylindrical enclosure for reception of a corresponding externally threaded portion 71 of the bowl 90. The threaded portion may also be externally of the head and internally of the bowl. Also, the bowl may be attached by other means, avoiding the use of threads, such as by a clamp, if desired. However, the attachment of the bowl to the head should be over a long reach so that the bowl remains attached to the head in a manner to prevent leakage therefrom during removal of the bowl from the head before the valve sleeve has closed off the line.

The lower wall portion of the chamber 53 in the head has a sealing surface 72, incorporating, as shown, a pair of sealing elements 73 and 73', which in this case are a combination of a Viton A O-ring and a back-up ring of Teflon (polytetrafluoroethylene), and engaging a corresponding sealing surface on the outside of the bowl 90. The outer surface of valve sleeve 59 engages the sealing surface 72 and elements 73 and 73' of the chamber 53 at the time the valve sleeve is in its lowermost or closed position, and thus closes off the line 51 at the end of chamber 53, as best seen in FIGURE 2.

A pair of sealing elements 73 and 73', as shown, ensure a leakproof seal at all times that the bowl is attached to the head over the long reach shown between these elements. The lower element 73' can be omitted, in which event the connection is tight enough to prevent external leakage during normal removal operations, although it is not leakproof. Such a construction is shown in FIGURE 2, the filter assembly otherwise being similar to that of FIGURE 1.

A relief line 80 is provided in the head 50, as best seen in FIGURE 3. Disposed across the relief line is a relief valve 81, which can be designed to open at any predetermined pressure differential, thus permitting bypass of the filter when the filter is clogged partially or wholly, or while the filter is being changed. A differential pressure indicator 82 in accordance with U.S. Patent No. 2,942,572 gives an indication when a predetermined pressure differential is reached between chambers 53 and 54.

The bowl 90 carries the filter element 67 which is disposed centrally in the bowl, dividing it into an outer inlet chamber 69 and an inner outlet chamber 68, communicating, respectively, with the inlet chamber 53 and the outlet chamber 54 in the head. The filter element is held firmly on a Belleville washer 75, which centers the element in the bowl. Spring 76 seated between a C-flange on the lower face of the valve sleeve 59 and the flange 77 on the seat 65 ensures removal of the filter element with the bowl. Welded beneath the flange 77, closely abutting the edge of the filter, is the anti-vibration ring 78, which centers the upper end of the filter unit in the valve seat 65, and prevents reverse assembly.

The Belleville washer 75 in conjunction with the 45° angle of the seat between the valve sleeve 59 and the valve seat 65 and the antivibration ring 78 prevents vibration of the filter element in use. The lower end of the bowl has a shaped pad 91 to receive a wrench to facilitate sealing, and removal from the head. A knurled portion 92 is provided for a hand grip.

The upper edge of the bowl 90 has a castellated portion 93 which extends into the space below the valve sleeve 59, and serves to permit flow of fluid while the valve sleeve is in the open position, as shown in FIGURE 1, and while it is closing to the position shown in FIGURE 2, and at the same time, this portion 93 retains the sealing element 73 in place while the valve sleeve is closing during removal or installation of the bowl. These castellations can also be placed on the lower side of the valve sleeve 59, in which case they have the same function; such an embodiment is shown in FIGURE 2, the castellation 94 depending from the valve sleeve 59.

The filter element 67 can be of any desired construction. A desirable type is made of wire mesh fabric, sintered if desired at the points of crossing to prevent displacement of the wires under high fluid pressures. A preferred form of element of this type is described in U.S. Patent No. 2,925,650. This element can be corrugated for a greater area of filter surface in a small volume, and this type of element is employed in the device shown in the drawing.

The operation of the devices of FIGURES 1 to 3 is as follows:

In normal use for filtration of fluid flow, the elements of the assemblies are in the position as shown in FIGURE 1. Fluid to be filtered enters the device at 51, proceeds through chambers 53 and 69, and then, passing through the filter 67, enters the inner chamber 68. Filtered fluid passes thence through chamber 54 to the outlet 52, where it emerges from the device. As the filter element becomes clogged, the pressure in chamber 53 increases, and at the predetermined maximum pressure differential between chambers 53 and 54 at which cleaning or replacement is required, an indication of the excess pressure condition is given by the differential pressure indicator 82. Thereupon, the filter bowl 90 is unscrewed from the head, suitably by applying a wrench to the wrench pad 91. As the bowl is removed, the valve seat 65 drops down, forced by the spring 61. The long reach over the threaded portion 71 keeps the bowl 90 attached to the head in a manner to prevent leakage therefrom to the exterior of the device during the entire time the valve sleeve is moving downwardly into position to engage the sealing elements 73 and sealing surface 72 of the head. The castellated portion 93 at the upper end of the filter bowl 90 as shown in FIGURE 1, or at the lower end of the valve sleeve 59 as shown at 94 in FIGURE 2, prevents escape of the sealing element 73 while the flow continues during closing of the valve sleeve. Thus, by the time the top end of the bowl 90 is ready to be freed from the end of the threads 71 in the head, the valve sleeve 59 has fallen into the closed position shown in FIGURE 2, sealing off the chambers 53 and 54. The bowl, together with the internal core 66, filter element 67 and seat 65, can now be separated therefrom without danger of leakage from the line. At this time, the spring 76 becomes free of the seat, and depends from its C-flange support in the valve sleeve, which itself is held in sealing position by the diaphragm retainer bushing 58. At a sufficient differential pressure between chambers 53 and 54, the relief valve 81 will open, bypassing the filter.

Upon reassembly, the cleaned or new filter element is put in position in the bowl 69, centering it on the Belleville washer 75. The bowl is filled with fluid if it is desired to avoid introduction of air into the system at the time reassembly is complete. After the bowl has been threaded partially onto the head, the valve seat 65 engages and begins to push upwardly the valve sleeve 59, eventually breaking the seal between the valve sleeve 59 and surfaces 57 and 72, opening the inlet and outlet chambers 53 and 54 of the head to the outside and inside, respectively, of the filter, for passage of fluid therethrough. At this time, the castellated portion 93 on the bowl 90 as shown in FIGURE 1, or at the lower end of the valve sleeve 59 as shown at 94 in FIGURE 2, prevents escape of the sealing element 73 at the first rush of fluid when the valve sleeve opens, a feature that is particularly desirable when an empty bowl is installed. When the bowl is finally tightened on the head, the outer top portion engages the sealing element 73, ensuring a leakproof seal between the bowl and head during operation, and the valve sleeve has been again returned into position so as to form a leakproof seal at surface 60. Air is prevented from entering the system during assembly because at the time of attachment of the bowl to the head, the top of the bowl extends above the lower portion of the valve sleeve 59, and thus immerses this in fluid. Air, consequently, cannot be trapped between the top of the bowl and the valve sleeve, air being displaced before the bowl is sealed to the head.

As above-mentioned, the filter assembly of this invention is particularly well adapted for use in hydraulic systems for aircraft, and these generally employ pressures in the range of 3,000 p.s.i. Any suitable type of filtering material may be employed, but it is preferred that porous, sintered stainless steel filters, such as those illustrated and described in United States Patent No. 2,925.650, dated February 23, 1960, be employed. This application is a continuation-in-part of Serial No. 610,917, filed September 20, 1956, now U.S. Patent No. 2,945,591.

What is claimed is:

1. A filter comprising a head, two passages for fluid passage therethrough, respectively communicating with two open ended concentrically arranged inner and outer chambers having a wall therebetween, a valve stop member mounted on said head and disposed across the open end of the inner chamber, a valve sleeve member mounted reciprocally on the wall and having sealing surfaces upon its outer and inner side faces, the outer side sealing surface being adapted to engage a corresponding sealing surface upon the outer wall of the outer chamber, and the inner side sealing surface being adapted to engage a corresponding sealing surface upon the outer face of the valve stop member, the valve sleeve member being reciprocally movable into and out from engagement with such surfaces, and when in engagement therewith closing off both outer and inner chambers, spring bias means urging said valve sleeve member into such engagement, a bowl removably attached to the head including actuating means to engage said valve sleeve member to maintain said valve sleeve member in an open position while the bowl is attached to the head, a removable sealing element disposed in the sealing surface upon the outer wall of the outer chamber, a castellated member positioned upon the bowl, permitting flow of fluid between the valve sleeve member and the bowl while the valve sleeve is in an open position, and retaining the sealing element in position on the sealing surface while the valve sleeve is entering a closed position, and a filter disposed in the bowl communicating on the inside with the inner chamber and on the outside with the outer chamber in the head when the sleeve member is in an open position.

2. A filter in accordance with claim 1 having the actuating means attached at the upper portion of the filter element adapted to engage the valve sleeve member and maintain the same in an open position.

3. A filter in accordance with claim 1, in which the bowl is threaded on the head over a distance longer than the distance encompassed by reciprocation of the valve sleeve member between its closed and open positions, whereby during disassembly the valve sleeve member assumes the closed position before the bowl is disengaged from the threaded portion of the head.

4. A filter in accordance with claim 1, in which the head is provided with a relief passage for passage of fluid bypassing the filter, and a relief valve disposed in the relief passage for passage of fluid therethrough only at a pressure above a predetermined minimum.

5. A filter in accordance with claim 1, comprising a differential pressure indicator connecting with inlet and outlet chambers in the head to indicate an increase in pressure differential therebetween revealing a clogged condition of the filter.

6. A filter in accordance with claim 1, in which the head and bowl are arranged so that the bowl is dependent from the head, and the valve sleeve member is positioned below the top of the bowl, whereby, during assembly, a bowl full of fluid being attached to the head, will immerse the valve sleeve member in fluid, thereby ensuring against entrapment of air.

7. A filter comprising a head, two passages for fluid passage therethrough, respectively communicating with two open ended concentrically arranged inner and outer chambers having a wall therebetween, a valve stop member mounted on said head and disposed across the open end of the inner chamber, a valve sleeve member mounted reciprocally on the wall and having sealing surfaces upon its outer and inner side faces, the outer side sealing surface being adapted to engage a corresponding sealing surface upon the outer wall of the outer chamber, and the inner side sealing surface being adapted to engage a corresponding sealing surface upon the outer face of the valve stop member, the valve sleeve member being reciprocally movable into and out from engagement with such surfaces, and when in engagement therewith closing off both outer and inner chambers, spring bias means urging said valve sleeve member into such engagement, a bowl removably attached to the head including actuating means to engage such valve sleeve member to maintain said valve sleeve member in an open position while the bowl is attached to the head, a removable sealing element disposed in the sealing surface upon the outer wall of the outer chamber, a castellated member positioned upon the valve sleeve member permitting the flow of fluid between the valve sleeve member and the bowl while the valve sleeve is in an open position, and retaining the sealing element in position on the sealing surface while the valve sleeve is entering a closed position, and a filter disposed in the bowl communicating on the inside with the inner chamber and on the outside with the outer chamber in the head when the sleeve member is in an open position.

8. A filter in accordance with claim 7, in which the head is provided with a relief passage for passage of fluid bypassing the filter, and a relief valve disposed in the relief passage for passage of fluid therethrough only at a pressure above a predetermined minimum.

9. A filter in accordance with claim 7, comprising a differential pressure indicator connecting with inlet and outlet chambers in the head to indicate an increase in pressure differential therebetween revealing a clogged condition of the filter.

10. A filter in accordance with claim 7, in which the head and bowl are arranged so that the bowl is dependent from the head, and the valve sleeve member is positioned below the top of the bowl, whereby, during assembly, a bowl full of fluid being attached to the head, will immerse the valve sleeve member in fluid, thereby ensuring against entrapment of air.

References Cited in the file of this patent
UNITED STATES PATENTS

| | | |
|---|---|---|
| 1,268,160 | Sammons | June 4, 1918 |
| 2,431,782 | Walton et al. | Dec. 2, 1947 |
| 2,544,244 | Vokes | Mar. 6, 1951 |
| 2,669,707 | Ehrman | Feb. 16, 1954 |
| 2,775,256 | Hanson | Dec. 25, 1956 |
| 2,801,751 | Thomas | Aug. 6, 1957 |
| 2,932,400 | Scavuzzo | Apr. 12, 1960 |
| 2,942,572 | Pall | June 28, 1960 |
| 2,945,591 | Pall | July 19, 1960 |